April 29, 1952  A. E. RUTTER  2,594,592
PLOW HITCH
Filed Aug. 14, 1948

Inventor.
Alvah E. Rutter
By Soans, Pond & Anderson
Attys

Patented Apr. 29, 1952

2,594,592

UNITED STATES PATENT OFFICE 2,594,592

PLOW HITCH

Alvah E. Rutter, Rockford, Ill., assignor to J. I. Case Company, Racine, Wis., a corporation of Wisconsin Application August 14, 1948, Serial No. 44,327

5 Claims. (Cl. 280—33.9)

1

The present invention relates generally to an improved plow hitch construction, and in particular relates to an improved plow hitch for use with a wheeled, multi-bottom plow.

Plows of the class described usually include a frame supported upon a pair of suitable support wheels by offset, depending axles, one or more of which are movable relative to the frame. The forward end of the frame is connected by a drawbar to the tractor or other draft vehicle which is to be associated with the plow, and the usual plow bottoms and coulters are attached to the rearward end of the frame. Means are also provided for raising the plow bottoms to an elevated or transport position and for lowering the plow bottoms into the ground to the plowing position. The means for adjusting the position of the plow bottoms may include a mechanically or hydraulically actuated adjusting linkage connected intermediate the support wheels and the frame for raising and lowering the frame relative to the level of the ground. The raising or lowering of the plow frame by the adjusting linkage causes the frame to pivot relative to the drawbar since the frame is, in effect, rockably supported upon the support wheels.

The operation of the adjusting linkage and the shifting of the mechanical forces on the frame incident to the operation and transport of the plow require limited angular movement between the drawbar and the frame if the draft forces on the associated tractor are to be equalized and if shocks and stresses in the frame are to be minimized. Further, during operation it is desirable that the plow bottoms be free for limited up and down movement in the ground in the manner of a walking plow. This movement insures that the furrows will be uniform and it tends to reduce the draft forces necessary to draw the plow bottoms through the soil.

Various adjustable drawbar and hitch constructions have been proposed for such wheeled plows, but the prior constructions have been unduly complicated or have failed to provide the proper angular movement between the various elements. Moreover, such prior constructions do not adequately provide for absorbing the shocks and stresses which are incident to the operation and transport of the implement.

Therefore, the principal object of the present invention is the provision of an improved hitch for a wheeled plow which overcomes the deficiencies of the prior devices. More specific objects of the invention are the provision of a hitch construction for a wheeled plow which permits

2 limited, relative angular movement between the drawbar and the plow frame during the operation and transport of the implement, which tends to dampen any shocks which are transmitted to the frame from the plow bottoms, and which permits limited, free, up and down movement of the plow bottoms during operation. Other objects and advantages of the invention will be made apparent by reference to the following description and the accompanying drawings of one preferred embodiment thereof.

Figure 1:
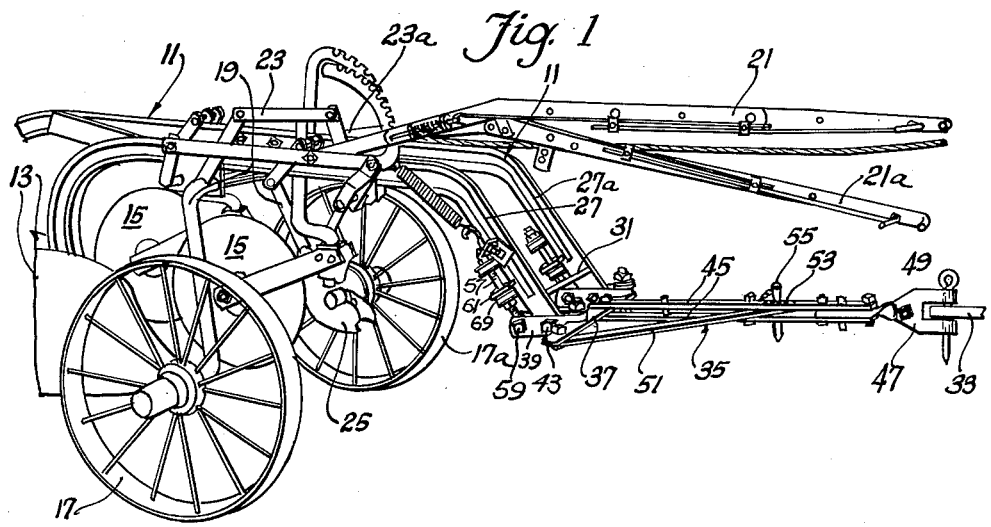
Fig. 1 is a perspective view of a wheeled plow having a hitch construction in accordance with the invention. The plow bottoms are in the elevated or transport position.

The wheeled plow illustrated, is of representative type and includes a longitudinally extending frame 11 upon which are supported a pair of plow bottoms 13 and a pair of coulters 15. The frame 11 is supported upon a pair of suitable wheels 17 and 17a by means of a pair of offset, depending axles 19 and 19a, the upper ends of which are rotatively journalled in the frame 11. A pair of forwardly extending adjusting levers 21 and 21a are connected to the depending axles by means of suitable linkages 23 and 23a in order to effect the control of the depth of the furrow being plowed and to level the plow bottoms in a direction extending transversely of the line of draft of the plow. The support wheel 17a is provided with a half-revolution or cyclic clutch 25 which, through a suitable linkage (not shown), raises or lowers the frame 11 relative to the ground to effect the movement of the plow bottoms 13 from the lowered operative or plowing position to the elevated transport position.

The frame 11 includes a pair of forwardly extending, downwardly curved members 27 and 27a which may be formed with a pair of reinforcing webs 29 along their outer edges. The forward ends of the frame members 27 are connected together by a transversely extending bracing member 31 which is adapted to strengthen the frame structure.

As particularly illustrated in Fig. 1, the forward end of the frame 11 is connected to the draft bar 33 of the associated tractor (not shown)

by means of a drawbar 35. The drawbar 35 may be substantially the same as the drawbar disclosed in my prior Patent No. 2,369,984, which is assigned to the assignee of the present invention, and, for purposes of illustration, this drawbar will be briefly described. The rearward end of the drawbar 35 includes a transversely extending connecting member 37 to which is attached a pair of spaced-apart rearwardly extending links which in the illustrated structure constitute the clevises 39. The clevises 39 are each pivotally connected to the connecting member 37 by means of vertically extending pivots or bolts 41, as illustrated, so that they are fixed in a vertical plane but are free to rotate a limited amount in a horizontal plane. Each of the clevises 39 is attached intermediate its forward or closed end and its rearward or open end to one of the longitudinally extending frame members 27 by a transversely extending, horizontally disposed pivot or bolt 43. In effect, the drawbar structure includes a bifurcated yoke having rearwardly extending arms which are pivotally connected to the frame by means of horizontally disposed pivots. The connecting member 37 is free to pivot about the transversely disposed axis defined by the bolts 43, and the frame 11 and plow bottoms 13 can move angularly relative to the drawbar 35.

A pair of vertically spaced apart, forwardly extending draft members 45 join the connecting member intermediate the two clevises 39 to a hitch plate 47 which is connected to the tractor draft bar 33 by a suitable hitch pin 49. An adjustable bracing and positioning member 51 for locating the plow relative to the track of the draft vehicle extends between the end of the connecting member 37 and a point on the forwardly extending draft members 45 between the implement and the tractor. The connections between the connecting member 37 and the draft members 45, and the connection between the connecting member 37 and the bracing member 51 include vertically extending pivots. The connection between the bracing member 51 and the draft members 45 is made adjustable by the provision of a plurality of engaging holes 53 in the draft members 45 and a latch pin 55 which is adapted to index the bracing member 51 between the draft members 45 in a position determined by the selection of the engaging hole 53. The described drawbar construction permits an adjustment of the position of the plow laterally relative to the tractor and enables the operator to balance the pulling forces in a horizontal plane.

Figure 2:
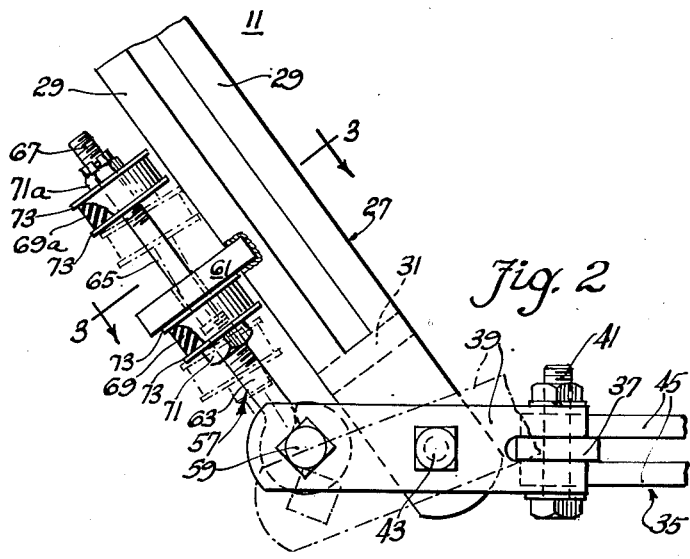
Fig. 2 is a fragmentary, elevation view of the hitch construction illustrated in Fig. 1.
Figure 3:
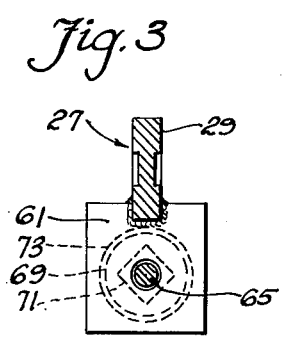
Fig. 3 is a view taken on line 3—3 in Fig. 2.
Figure 4:
Fig. 4 is a plan view, partly in section, of the pivotal connection between the drawbar and the implement frame.

A generally vertically extending positioning and guiding link or guide rod 57 is pivotally connected to the rearward end of each of the clevises 39. As illustrated, the member 57 may conveniently comprise an eye-bolt whose ring or eye is engaged by a transversely extending, horizontally disposed pivot or bolt 59. The shanks of the eye-bolts 57 extend upwardly through openings in a pair of guide brackets 61, one of which is rigidly attached to each of the associated frame members 27 and 27a. As illustrated in Fig. 2 the shank of each of the eye bolts 57 is provided with a threaded portion 63 at its lower end, a smooth bearing portion 65 at its center, and a second threaded portion 67 adjacent its upper end. The center bearing portion 65 has a diameter which is equal to the diameter of the bolt shank at the root of the threads on the lower portion 63, and the crowns or ridges of the threads on the upper portion 67 have a diameter which is equal to the diameter of the bearing portion 65. Thus the bearing portion 65 can slide axially relative to the bracket 61 without causing damage to the threaded portions. This construction facilitates the removal of spacing and adjusting nuts which will hereinafter be described.

In order to limit the axial movement of the eye-bolt shanks relative to the brackets 61 and to thereby limit the angular movement between the frame 11 and the drawbar 35, blocks of rubber or other resilient material 69 and 69a are attached to the shank of each of the bolts, the block 69 being located below the bracket 61 and the block 69a being located above the bracket 61. The resilient blocks 69 and 69a are positioned by means of spacing or adjusting nuts 71 and 71a respectively, which engage the threaded portions 63 and 67 of the bolt shank. The resilient blocks 69 and 69a are spaced apart a distance such that when the plow bottoms are in the lowered operative position, the bracket 61 rides on the center bearing portion 65 of the eye bolt shank in a position intermediate the resilient blocks.

The resilient blocks 69 and 69a illustrated, are cylindrical in shape and are provided with a longitudinally extending passageway which is proportioned to receive the shank of the eye bolt 57. Each end of the cylindrical block is provided with a protecting disk 73 of metal or the like. Thus, in operation when the eye bolt shank 57 and the associated disks and blocks move relative to the bracket 61, the surfaces of the resilient blocks which come in contact with the bracket are protected from tearing and undue wear.

During operation when the plow is raised to the transport position, the weight of the plow bottoms and coulters tends to rotate the frame 11 about the support wheels 17 and 17a, thereby causing the forward end of the frame to rise and to force the lower resilient block 69 against the bracket 61. The lower resilient block 69 tends to absorb road shock and other vibrations which result from the movement of the implement in the transport position. When plowing, the plow bottoms 13 are lowered by the clutch 25 and as the bottoms 13 start to enter the soil as the implement is moved forward, the forward end of the frame is moved downwardly and the bracket 61 engages the upper resilient block absorbing the shocks incident to the beginning of the furrow. After the plow bottoms reach the desired depth they tend to automatically level off and the drawbar pulls on the frame members 27 at an angle such that the resilient blocks are evenly spaced from the brackets 61. Minor variations in the depth of the plow which are caused by slight changes in soil density or composition result in the free movement of the bearing portion of the bolt shank through the bracket without producing excessive stresses in the frame or drawbar. If the plow strikes a stone or other object under the ground, the connection between the drawbar and the frame will move up or down depending upon the position of the object relative to the plow bottom, and the shock of the impact will be absorbed by the resilient block which is engaged by the bracket 61. Fig. 2 illustrates the position of the resilient blocks and the brackets 61 when the plow is in the transport position or under any other circumstances where the lower resilient blocks are engaged by the brackets 61. The dotted outline in Fig. 2 shows the relative positions of the frame and the drawbar and the position of the resilient blocks, 69 and 69a, and the bracket 61 when the plow is in the "free floating" position at the proper depth in the furrow.

The limited free angular movement which is permitted by a plow hitch constructed in accordance with the invention has been found to be of great advantage in plowing rough and rolling fields, because fatigue failures in welded connections have been minimized, and because shocks, incident to the operation of the implement are absorbed by the resilient blocks instead of being transmitted to the tractor. Further, the plow tends to seek its own level without over-stressing the drawbar or the implement frame. The resilient blocks which form a part of the invention may be moved together to closely limit the free relative movement between the drawbar and frame, and in some instances it may be desirable to move the resilient blocks into a position where they are in contact with the bracket on the frame. Of course, when the resilient bumpers or blocks are in contact with the bracket, the advantages of the free action of the plow bottoms are not obtained but the amount of shock and vibration which is transmitted to the tractor is largely reduced.

Various features of the invention which are believed to be new are set forth in the appended claims.

I claim:

1. In a wheel plow which includes a frame for supporting at least one plow bottom, and a drawbar, means including a horizontally disposed pivot which extends transversely of the line of draft of said plow for connecting said drawbar to said frame, and means intermediate said frame and said drawbar for limiting the free pivotal movement of said drawbar relative to said frame, said means including a guide rod connected at one end by a horizontally disposed, transversely extending pivot to said drawbar, a bracket attached to said frame, said bracket having an aperture therein for receiving the other end of said rod, and spaced-apart resilient means attached to said rod for yieldingly resisting pivotal movement of said frame relative to said drawbar in excess of the free movement permitted by the space between said resilient means.

2. In a wheel plow which has a frame for supporting at least one plow bottom, said frame including a pair of spaced apart, mechanically interconnected members which extend generally longitudinally of the line of draft of said plow, and a drawbar which has a pair of rearwardly extending sections which are spaced apart to register with said longitudinally extending frame members, means including horizontally disposed pivots which extend transversely of the line of draft of said plow for connecting the forward end of said rearwardly extending sections of said drawbar to the forward end of said frame member intermediate the ends of said sections, a bracket having an aperture formed therein attached to each of said longitudinally extending members of said frame, a guide rod slidably supported within each of said apertures, one end of each of said rods being connected to the rearward end of said rearwardly extending section of said drawbar by transversely extending pivots, and means attached to said rod above and below said bracket for permitting limited free angular movement of a predetermined amount between said drawbar and said frame and for resiliently resisting angular movement exceeding said limit including a block of resilient material attached to each of said rods on each side of said apertured bracket.

3. In a wheel plow which has a frame for supporting at least one plow bottom, said frame including a pair of longitudinally extending spaced apart members, and a drawbar which has a pair of rearwardly extending sections which are spaced apart to register with said longitudinally extending frame members, means for pivotally connecting the forward ends of said rearwardly extending sections of said drawbar to the forward ends of said frame members at a point intermediate the ends of said sections, a bracket having an aperture formed therein attached to each of said longitudinally extending members of said frame, a pair of eye bolts each having an eye section and a shank section, each of said bolts being connected to the rearward end of one of said rearwardly extending sections of said drawbar by a pivot, the shank of each of said bolts being slidably supported within the aperture of one of said brackets, said shank including a smooth, bearing section and a pair of threaded sections one of which is located on each side of said bearing section, and a block of resilient material positionable on each of said threaded sections by a threaded fastening means for limiting the relative angular movement between said frame and said drawbar.

4. In a wheel plow which includes a frame member for supporting at least one plow bottom, and a drawbar member, means for pivotally connecting said frame member to said drawbar member, means intermediate said pivotally interconnected members for limiting the pivotal movement of said drawbar member relative to said frame member, said means including a link, means pivotally connecting said link at one end thereof to one of said pivotally interconnected members, means providing a slidable connection between the other end of said link and the other of said pivotally interconnected members, said slidable connection including a guide which is integral with the other of said members and which is engaged by a portion of said link, and a pair of spaced apart, resilient means arranged to limit relative movement between said link and said guide which exceeds the free movement permitted by the space between said resilient means.

5. In a wheel plow which has a frame for supporting at least one plow bottom said frame including a pair of spaced apart longitudinally extending members providing forward downwardly directed portions, and a drawbar which has a pair of rearwardly extending sections which are spaced apart to register with said downwardly directed portions, means for pivotally connecting the rearwardly extending sections of said drawbar to the downwardly directed portions of said frame members, said rearwardly extending sections each having a portion extending rearwardly of the pivotal connecting means, a bracket having an aperture formed therein and attached to each of said downwardly directed portions of said frame, a guide rod slidably supported within each of said apertures, one end of each of said guide rods being pivotally connected to the rearwardly extending portion of one of said sections of said drawbar, a first resilient compression member on said guide rod above said bracket and a second resilient compression member on said guide rod below said bracket, said resilient compression members being adjustable to various positions axially of said guide rods for engagement with said brackets to control pivotal movement between said downwardly directed portions of said frame and said rearwardly extending sections of said drawbar.

ALVAH E. RUTTER.

REFERENCES CITED

The following references are of record in the file of this patent:

UNITED STATES PATENTS

| Number | Name | Date |
|---|---|---|
| 1,819,393 | Staley | Aug. 18, 1931 |
| 1,877,126 | Greer | Sept. 13, 1932 |
| 2,331,006 | Suttles | Oct. 5, 1943 |
| 2,332,065 | Ego | Oct. 19, 1943 |
| 2,369,984 | Rotter | Feb. 20, 1945 |